(12) United States Patent
Koreeda et al.

(10) Patent No.: US 7,430,159 B2
(45) Date of Patent: Sep. 30, 2008

(54) OPTICAL PICK-UP AND OBJECTIVE LENS FOR USE WITH DIFFERENT TYPES OF OPTICAL DISCS

(75) Inventors: Daisuke Koreeda, Saitama-ken (JP); Koichi Maruyama, Tokyo (JP)

(73) Assignee: Hoya Corporation, Tokyo (JP)

( * ) Notice: Subject to any disclaimer, the term of this patent is extended or adjusted under 35 U.S.C. 154(b) by 588 days.

(21) Appl. No.: 11/036,989

(22) Filed: Jan. 19, 2005

(65) Prior Publication Data

US 2005/0157624 A1 Jul. 21, 2005

(30) Foreign Application Priority Data

Jan. 20, 2004 (JP) .............................. 2004-012236

(51) Int. Cl.
*G11B 7/00* (2006.01)

(52) U.S. Cl. .............................. 369/112.08; 369/112.23

(58) Field of Classification Search ........................ None
See application file for complete search history.

(56) References Cited

U.S. PATENT DOCUMENTS

| | | | |
|---|---|---|---|
| 4,936,665 A | 6/1990 | Whitney | |
| 5,696,750 A | 12/1997 | Katayama | |
| 6,088,322 A | 7/2000 | Broome et al. | |
| 7,206,276 B2 * | 4/2007 | Kimura et al. | 369/112.08 |
| 2001/0008513 A1 * | 7/2001 | Arai et al. | 369/112.08 |
| 2002/0181366 A1 * | 12/2002 | Katayama | 369/53.2 |
| 2004/0190417 A1 * | 9/2004 | Watanabe et al. | 369/53.11 |
| 2004/0246873 A1 | 12/2004 | Maruyama et al. | |
| 2004/0257958 A1 * | 12/2004 | Kimura et al. | 369/112.03 |
| 2005/0002118 A1 | 1/2005 | Maruyama et al. | |
| 2005/0025028 A1 * | 2/2005 | Hirai et al. | 369/112.05 |
| 2005/0078593 A1 | 4/2005 | Maruyama et al. | |
| 2005/0105447 A1 * | 5/2005 | Ikenaka et al. | 369/112.06 |
| 2007/0070861 A1 * | 3/2007 | Ikenaka | 369/112.08 |

FOREIGN PATENT DOCUMENTS

JP 9306024 11/1997

* cited by examiner

*Primary Examiner*—Joseph Feild
*Assistant Examiner*—Peter Vincent Agustin
(74) *Attorney, Agent, or Firm*—Greenblum & Bernstein, P.L.C.

(57) ABSTRACT

There is provided an optical pick-up used for recording data to and/or reproducing data from at least three types of optical discs having at least two different thicknesses of cover layers. The optical pick-up includes light sources and an objective lens. A thickness t1 of a first optical disc, a thickness t2 of a second optical disc, and a thickness t3 of a third optical disc satisfy a relationship $t1 \leq t2 < t3$. A numerical aperture NA1 for the first optical disc, a numerical aperture NA2 for the second optical disc and a numerical aperture NA3 for the third optical disc satisfy a relationship $NA1 \geq NA2 > NA3$. Further, a first light beam for the first optical disc is incident on the objective lens as a converging light beam, and the second and third light beams for the second and third optical discs are incident on the objective lens as diverging light beams, respectively. Given that magnification of the objective lens is m1 when the first optical disc is used, magnification of the objective lens is m2 when the second optical disc is used, and magnification of the objective lens is m3 when the first optical disc is used, following conditions are satisfied: $m1 > 0$, $m3 < m2 < 0$.

18 Claims, 6 Drawing Sheets

OPTICAL PICK-UP AND OBJECTIVE LENS FOR USE WITH DIFFERENT TYPES OF OPTICAL DISCS

BACKGROUND OF THE INVENTION

The present invention relates to an optical pick-up and an objective lens used for an optical disc device, which is capable of recording data to and/or reproducing data from a plurality of types of optical discs having different recording densities and/or having different thicknesses of cover layers.

There are various types of optical discs on which digital information is recorded at various densities, respectively. For example, a DVD (digital versatile disc) has a recording density higher that that of a CD (compact disc) or a CD-R (CD Recordable) and has a cover layer thinner than that of the CD or CD-R.

When a recording/reproducing operation for the DVD having a higher recording density is performed, a smaller beam spot diameter is required on a recording surface of the DVD relative to a beam spot used for the CD having a lower recording density. For this reason, the optical pick-up is configured such that a NA (numerical aperture) is changed to a higher value to obtain a smaller beam spot diameter when the DVD is used and that the NA is changed to a lower value to obtain a larger beam spot diameter when the CD or CD-R is used.

The diameter of the beam spot decreases as a wavelength of the laser beam decreases. Therefore, in general, a laser beam having a wavelength of about 660 nm, which is shorter than a wavelength of about 780 nm for the CD, is used for the DVD. Recently, the optical disc device employing an optical pick-up having a light source unit capable of outputting laser beams having different wavelengths has been used.

A condition of a spherical aberration in an optical system of the optical pick-up changes depending on a thickness of the cover layer of the optical disc being used. Therefore, it is required to correct the spherical aberration caused when the optical disc is changed to another one having different thickness of cover layer while changing the NA in accordance with the type of the optical disc being used.

Japanese Patent Provisional Publication No. HEI 9-306024 (hereafter, referred to as a document 1) discloses an optical system in which magnification of an objective lens is set for each of light beams having different wavelengths so that the light beams are suitably converged onto recording surfaces of plurality of types of optical discs, respectively. In this optical system, the spherical aberration caused by the change of the thickness of the cover layer of the optical disc is cancelled by the spherical aberration caused by the change of a refractive index of the objective lens due to a change of the wavelength.

In the optical system disclosed in the document 1, a converging laser beam is incident on an objective lens when the optical disc having a higher recording density (e.g. DVD) is used. That is, the objective lens supports two types of optical discs.

SUMMARY OF THE INVENTION

It seems that the objective lens disclosed in the document 1 is configured to suppress deterioration of optical performance due to tracking operation for the optical disc having lower recording density (e.g. CD) while suppressing deterioration of the spherical aberration due to temperature variation during use of the optical disc having the higher recording density (e.g. DVD).

Recently, new technical standards concerning optical discs having further higher recording densities are proposed. One of such optical discs is an HD DVD (High Definition DVD) having a recording density higher than that of the DVD. The HD DVD has a thickness of the cover layer smaller than or equal to that of the DVD. For the HD DVD, the laser beam having a wavelength shorter than that for the DVD (i.e., a so-called blue laser) is required.

With progress of practical use of the optical discs having further higher recording densities such as an HD DVD, the demand for optical disc devices which can provide compatibility among existing optical discs (e.g., CD and DVD) and the optical discs of the new technical standards (e.g., HD DVD) is increasing. To accomplish such an optical disc device, an objective lens that is capable of converging incident beam on recording surfaces of various types of optical discs including the CD, DVD and HD DVD is required.

However, the objective lens disclosed in the document 1 (i.e. conventional objective lens) supports only two types of optical discs (i.e. DVD and CD). Therefore, the objective lens can not be used for the new standard optical disc. If the laser beam of the blue laser diode is incident on the objective lens, various types of aberrations including the spherical aberration are caused on a recording surface of the new standard optical disc, and thereby it becomes impossible to form a beam spot suitable for recordation and/or reproduction for the new standard optical disc.

The present invention is advantageous in that it provides an optical pick-up which is capable of converging an incident beam to form a suitable beam spot on recording surfaces of various types of optical discs including existing optical discs and an HD DVD while suppressing a spherical aberration, and is also capable of suppressing deterioration of optical performance due to tracking operation during use of an existing optical disc having a relatively low recording density.

According to an aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths. One of the at least three light beams is selectively emitted when one of the at least three types of optical discs is used. The optical pick-up further includes an objective lens.

In this structure, when a thickness of a first optical disc of the at least three types of optical discs to be used for recording data and/or reproducing data using a first light beam of the at least three light beams having a wavelength shortest of all wavelengths of the at least three light beams is represented by $t1$, a thickness of a second optical disc of the at least three types of optical discs to be used for recording data and/or reproducing data using a second light beam of the at least three light beams having a wavelength longer than that of the first light beam is represented by $t2$, and a thickness of a third optical disc of the at least three types of optical discs to be used for recording data and/or reproducing data using a third light beam of the at least three light beams having a wavelength longest of all of the wavelengths of the at least three light beams is represented by $t3$, a relationship $t1 \leq t2 < t3$ is satisfied. When a numerical aperture required for recording data to and/or reproducing data from the first optical disc is represented by $NA1$, a numerical aperture required for recording data to and/or reproducing data from the second optical disc is represented by $NA2$, and a numerical aperture required for recording data to and/or reproducing data from the third optical disc is represented by $NA3$, a relationship $NA1 \geq NA2 > NA3$ is satisfied.

Further, the first light beam is incident on the objective lens as a converging light beam, and the second and third light beams are incident on the objective lens as diverging light beams, respectively. Given that magnification of the objective lens is m1 when the first optical disc is used, magnification of the objective lens is m2 when the second optical disc is used, and magnification of the objective lens is m3 when the third optical disc is used, following conditions are satisfied.

m1>0 m3<m2<0

With this configuration, for each of the at least three types of optical discs, the amounts of a coma and astigmatism caused by tracking shift movement of the objective lens are reduced to a negligible level while a spherical aberration is corrected suitably.

Optionally the thicknesses of the first, second and third optical discs are represented by t1, t2 and t3, respectively, t1 may be substantially equal to 0.6 mm, t2 may be substantially equal to 0.6 mm, and t3 may be substantially equal to 1.2 mm. In this case, given that a focal length of the objective lens is f1 when the first optical disc is used, a focal length of the objective lens is f2 when the second optical disc is used, and a focal length of the objective lens is f3 when the third optical disc is used, following conditions (1), (2) and (3) may be satisfied:

$$0.02 \leq f1 \times m1 < 0.06 \quad (1)$$

$$-0.04 \leq f2 \times m2 < 0.00 \quad (2)$$

$$-0.23 \leq f3 \times m3 < -0.13 \quad (3).$$

Still optionally, at least one of surfaces of the objective lens may have a first region including an optical axis of the objective lens, and have a second region surrounding the first region. The third light beam corresponding to the numerical aperture required for recording data to and/or reproducing data from the third optical disc is incident on the first region. In this case, the second region has a diffracting structure configured to converge the first and second light beams onto recording surfaces of the first and second optical discs, respectively, and not to contribute to convergence of the third light beam.

In a particular case, the diffracting structure of the second region may have a plurality of refractive surface sections divided by steps and at each step between adjacent refractive surface sections in the diffracting structure, an outer one of the adjacent refractive surface sections may give an additional optical path length substantially equal to $3\lambda_1$ or $-3\lambda_1$ with respect to an inner one of the adjacent refractive surface sections if the wavelength of the first light beam is represented by $\lambda_1$.

In a particular case, the diffracting structure of the second region may have a plurality of refractive surface sections divided by steps, and at each step between adjacent refractive surface sections in the diffracting structure, an outer one of the adjacent refractive surface sections may give an additional optical path length substantially equal to $5\lambda_1$ or $-5\lambda_1$ with respect to an inner one of the adjacent refractive surface sections if the wavelength of the first light beam is represented by $\lambda_1$.

In a particular case, an effective diameter of the first light beam on an incident surface of the objective lens may be larger than an effective diameter of the second light beam on the incident surface of the objective lens, and the at least one of surfaces of the objective lens may have a third region surrounding the second region. The third region has a diffracting structure configured to converge only the first light beam. In this structure, a diffraction order at which a diffraction efficiency for the first light beam takes a maximum value in the third region is different from a diffraction order at which the diffraction efficiency for the first light beam takes a maximum value in the second region.

Optionally, the diffracting structure of the third region may have a plurality of refractive surface sections divided by steps, and at each step between adjacent refractive surface sections in the diffracting structure of the third region, an outer one of the adjacent refractive surface sections may give an additional optical path length substantially equal to $1\lambda_1$ or $-1\lambda_1$ with respect to an inner one of the adjacent refractive surface sections if the wavelength of the first light beam is represented by $\lambda_1$.

In a particular case, an effective diameter of the second light beam on an incident surface of the objective lens may be larger than an effective diameter of the first light beam on the incident surface of the objective lens, and the at least one of surfaces of the objective lens may have a third region surrounding the second region. The third region has a diffracting structure configured to converge only the second light beam. In this structure, a diffraction order at which a diffraction efficiency for the second light beam takes a maximum value in the third region is different from a diffraction order at which the diffraction efficiency for the second light beam takes a maximum value in the second region.

Optionally, the diffracting structure of the third region may have a plurality of refractive surface sections divided by steps, and at each step between adjacent refractive surface sections in the diffracting structure of the third region, an outer one of the adjacent refractive surface sections may give an additional optical path length substantially equal to $1\lambda_2$ or $-1\lambda_2$ with respect to an inner one of the adjacent refractive surface sections if the wavelength of the second light beam is represented by $\lambda_2$.

Still optionally, when the wavelengths of the first and third light beams are respectively represented by $\lambda_1$ and $\lambda_3$, and refractive indexes of the objective lens for the first and third light beams are respectively represented by n1 and n3, a following relationship may be satisfied:

$$\lambda_1/(n1-1):\lambda_3/(n3-1) \approx 1:2 \quad (4).$$

According to another aspect of the invention, there is provided an objective lens for an optical pick-up used for recording data to and/or reproducing data from at least three types of optical discs having at least two different thicknesses of cover layers. At least three light beams are respectively used for the at least three types of optical discs. When a thickness of a first optical disc of the at least three types of optical discs to be used for recording data and/or reproducing data using a first light beam of the at least three light beams having a wavelength shortest of all wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, a relationship t1≦t2<t3 is satisfied.

Further, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 is satisfied. The first light beam is incident on the objective lens as a converging light beam, and the second and third light beams are incident on the objective lens as diverging light beams, respectively. Given that magnification of the objective lens for the first light beam is represented by m1, magnification of the objective lens for the second light beam is represented by m2, and magnification of the objective lens for the third light beam is represented by m3, the objective lens satisfies following conditions:

$m1>0$ $m3<m2<0.$

With this configuration, for each of the at least three types of optical discs, the amounts of a coma and astigmatism caused by tracking shift movement of the objective lens are reduced to a negligible level while a spherical aberration is corrected suitably.

Optionally, the thicknesses of the first, second and third optical discs are represented by t1, t2 and t3, respectively, t1 may be substantially equal to 0.6 mm, t2 may be substantially equal to 0.6 mm, and t3 may be substantially equal to 1.2 mm. In this case, given that a focal length of the objective lens is f1 when the first optical disc is used, a focal length of the objective lens is f2 when the second optical disc is used, and a focal length of the objective lens is f3 when the third optical disc is used, the objective lens may satisfy following conditions (1), (2) and (3):

$$0.02 \leq f1 \times m1 < 0.06 \quad (1)$$

$$-0.04 \leq f2 \times m2 < 0.00 \quad (2)$$

$$-0.23 \leq f3 \times m3 < -0.13 \quad (3).$$

Still optionally, at least one of surfaces of the objective lens may have a first region including an optical axis of the objective lens, and have a second region surrounding the first region. The third light beam corresponding to the numerical aperture required for recording data to and/or reproducing data from the third optical disc is incident on the first region. In this case, the second region has a diffracting structure configured to converge the first and second light beams onto recording surfaces of the first and second optical discs, respectively, and not to contribute to convergence of the third light beam.

In a particular case, the diffracting structure of the second region may have a plurality of refractive surface sections divided by steps, and at each step between adjacent refractive surface sections in the diffracting structure, an outer one of the adjacent refractive surface sections may give an additional optical path length substantially equal to $3\lambda_1$ or $-3\lambda_1$ with respect to an inner one of the adjacent refractive surface sections if the wavelength of the first light beam is represented by $\lambda_1$.

In a particular case, the diffracting structure of the second region may have a plurality of refractive surface sections divided by steps, and at each step between adjacent refractive surface sections in the diffracting structure, an outer one of the adjacent refractive surface sections may give an additional optical path length substantially equal to $5\lambda_1$ or $-5\lambda_1$ with respect to an inner one of the adjacent refractive surface sections if the wavelength of the first light beam is represented by $\lambda_1$.

In a particular case, an effective diameter of the first light beam on an incident surface of the objective lens may be larger than an effective diameter of the second light beam on the incident surface of the objective lens, and the at least one of surfaces of the objective lens may have a third region surrounding the second region. The third region has a diffracting structure configured to converge only the first light beam. In this structure, a diffraction order at which a diffraction efficiency for the first light beam takes a maximum value in the third region is different from a diffraction order at which the diffraction efficiency for the first light beam takes a maximum value in the second region.

Optionally, the diffracting structure of the third region may have a plurality of refractive surface sections divided by steps, and at each step between adjacent refractive surface sections in the diffracting structure of the third region, an outer one of the adjacent refractive surface sections may give an additional optical path length substantially equal to $1\lambda_1$ or $-1\lambda_1$ with respect to an inner one of the adjacent refractive surface sections if the wavelength of the first light beam is represented by $\lambda_1$.

In a particular case, an effective diameter of the second light beam on an incident surface of the objective lens may be larger than an effective diameter of the first light beam on the incident surface of the objective lens, and the at least one of surfaces of the objective lens may have a third region surrounding the second region. The third region has a diffracting structure configured to converge only the second light beam. In this structure, a diffraction order at which a diffraction efficiency for the second light beam takes a maximum value in the third region is different from a diffraction order at which the diffraction efficiency for the second light beam takes a maximum value in the second region.

Optionally, the diffracting structure of the third region may have a plurality of refractive surface sections divided by steps, and at each step between adjacent refractive surface sections in the diffracting structure of the third region, an outer one of the adjacent refractive surface sections may give an additional optical path length substantially equal to $1\lambda_2$ or $-1\lambda_2$ with respect to an inner one of the adjacent refractive surface sections if the wavelength of the second light beam is represented by $\lambda_2$.

DETAILED DESCRIPTION OF THE EMBODIMENTS

Hereinafter, an embodiment according to the invention are described with reference to the accompanying drawings.

Figure 1:
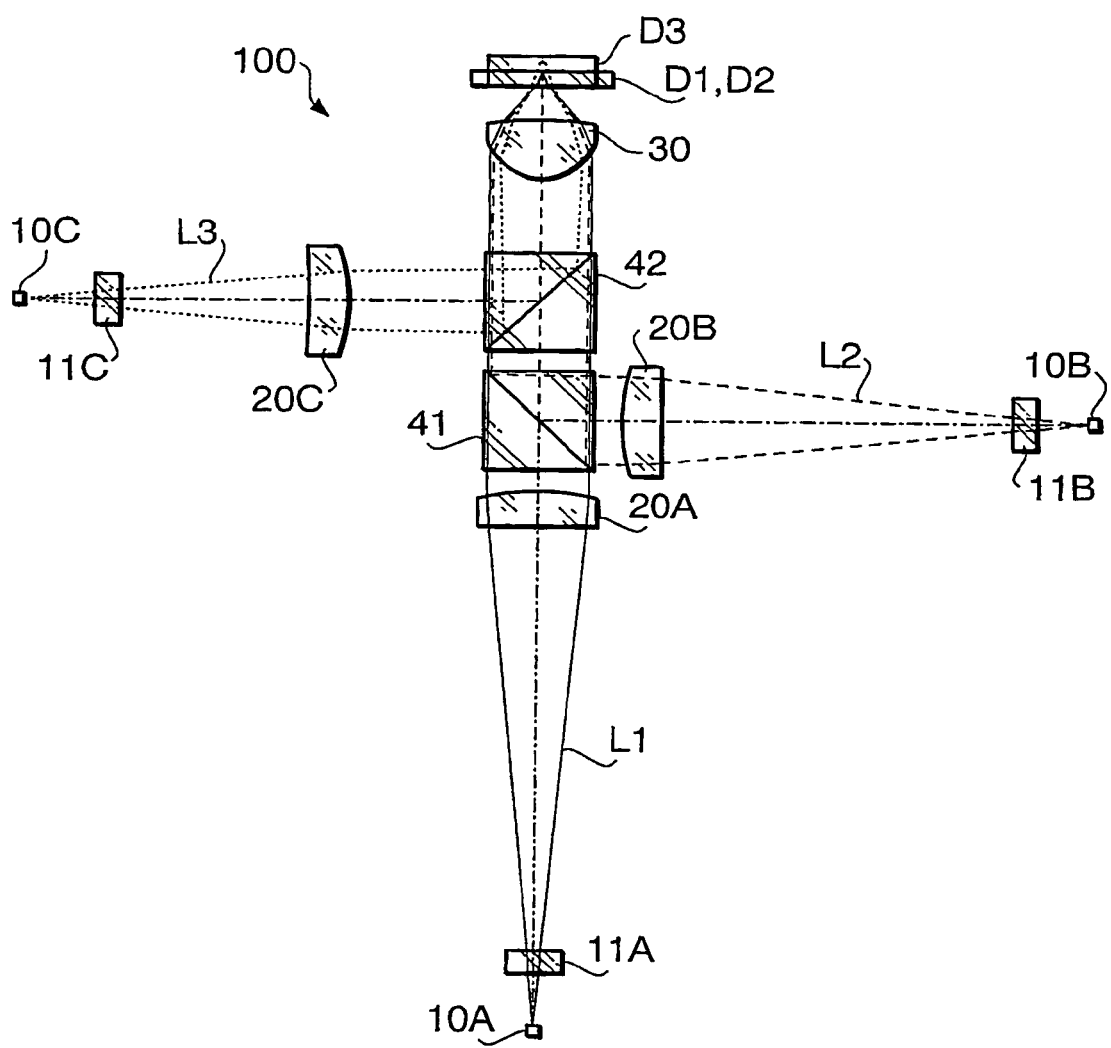
FIG. 1 schematically shows an optical pick-up including an objective lens according to an embodiment of the invention.

FIG. 1 schematically shows an optical pick-up 100 including an objective lens 30 according to an embodiment of the invention. The optical pick-up 100 is mounted in an optical disc device (including a recording-specific optical disc device, a reproducing-specific optical disc device, and an optical disc device capable of performing recording and reproducing operations) which supports three types of optical discs D1, D2 and D3. That is, the optical pick-up 100 (the objective lens 30) is used for recording data to and/or reproducing data from the three types of optical discs D1, D2 and D3.

In this embodiment, the optical disc D1 has the highest recording density of all of the optical discs D1, D2 and D3. The optical disc D1 is a new standard optical disc, such as an HD DVD. The optical disc D3 has the lowest recording density of all of the optical discs D1, D2 and D3. The optical disc D3 is, for example, a CD or CD-R. The optical disc D2 has a recording density lower than that of the optical disc D1. The optical disc D2 is, for example, a DVD or DVD-R. Each of the optical discs D1, D2 and D3 is mounted on a turn table (not shown) when the recording or reproducing operation is performed.

If thicknesses of cover layers of the optical discs D1, D2 and D3 are defined as t1, t2 and t3, respectively, the thicknesses t1, t2 and t3 satisfy the following relationship.

$$t1 \leq t2 < t3$$

As shown in FIG. 1, the optical pick-up 100 includes light sources 10A, 10B and 10C, cover glasses 11A, 11B and 11C, coupling lenses 20A, 20B and 20C, beam splitters 41 and 42, and the objective lens 30. Laser beams L1, L2 and L3 emitted by the light sources 10A, 10B and 10C are incident on the coupling lenses 20A, 20B and 20C via the cover glasses 11A, 11B and 11C, respectively. The laser beam L1 emerging from the coupling lens 20A is incident on the objective lens 30 via the beam splitters 41 and 42, and is converged by the objective lens 30 onto a recording surface (i.e. in the vicinity of the recording surface) of the optical disc D1. The laser beam L2 emerging from the coupling lens 20B is incident on the objective lens 30 via the beam splitters 41 and 42, and is converged by the objective lens 30 onto a recording surface (i.e. in the vicinity of the recording surface) of the optical disc D2. The laser beam L3 emerging from the coupling lens 20C is incident on the objective lens 30 via the beam splitter 42, and is converged by the objective lens 30 onto a recording surface (i.e. in the vicinity of the recording surface) of the optical disc D3.

Figure 2A:
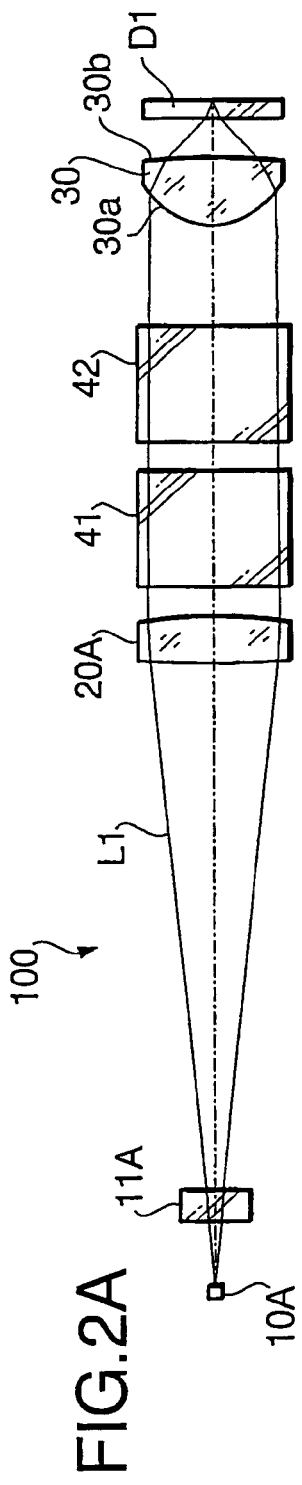
FIG. 2A schematically shows a configuration of the optical pick-up with regard to an optical path for an optical disc having the highest recording density.
Figure 2B:
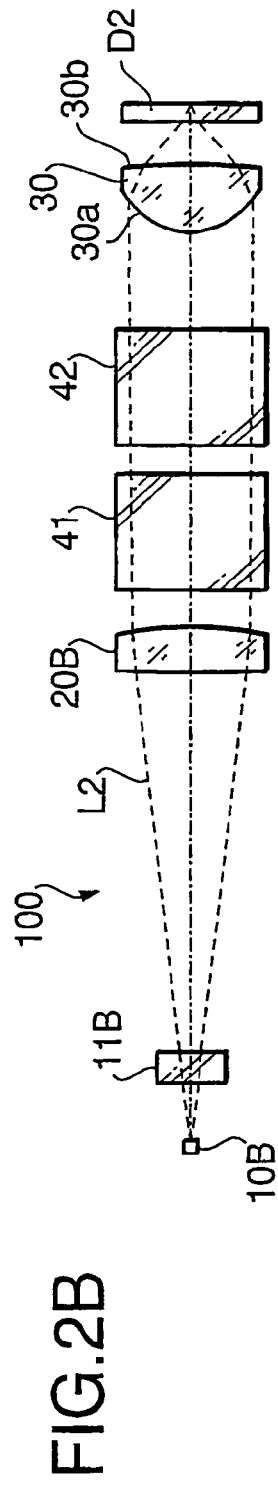
FIG. 2B schematically shows a configuration of the optical pick-up with regard to an optical path for the optical disc having the second highest recording density.
Figure 2C:
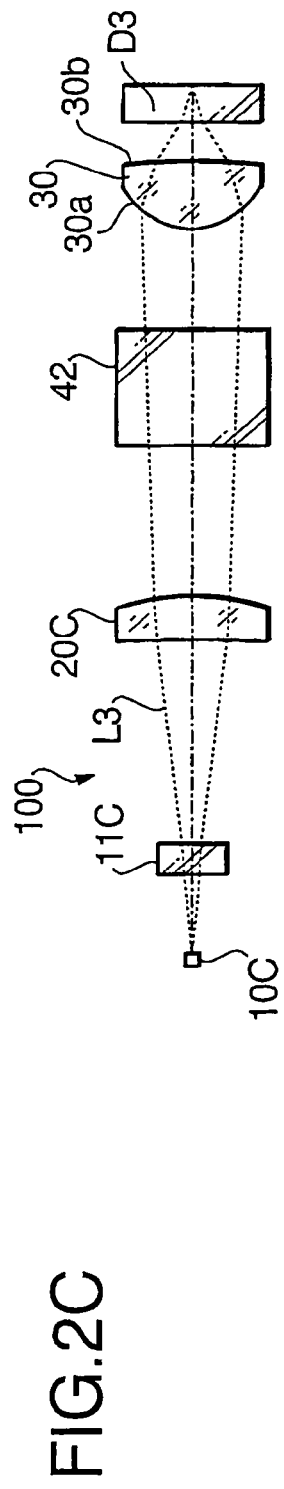
FIG. 2C schematically shows a configuration of the optical pick-up with regard to an optical path for an optical disc having the lowest recording density.

FIG. 2A schematically shows a configuration of the optical pick-up 100 with regard to an optical path for the optical disc D1. FIG. 2B schematically shows a configuration of the optical pick-up 100 with regard to an optical path for the optical disc D2. FIG. 2C schematically shows a configuration of the optical pick-up 100 with regard to an optical path for the optical disc D3. In FIGS. 2A to 2C, the optical system 100 is developed for the sake of simplicity. In FIGS. 1 and 2A to 2C, a reference axis is indicated by a chain line, and the laser beams L1, L2 and L3 emitted by the light sources 10A, 10B and 10C for the optical disc D1, D2 and D3 are indicated by a solid line, a dashed line and a dotted line, respectively.

It should be noted that although each of FIGS. 1 and 2A to 2C illustrates a situation in which the objective lens 30 is located on the reference axis (i.e., an optical axis of the objective lens 30 coincides with the reference axis), there is a case in which the optical axis of the objective lens 30 shifts from the reference axis by, for example, a tracking operation.

It is required to change a numerical aperture (NA) responsive to a recording density of the optical disc being used so that a beam spot having a suitable size for the optical disc being used is formed. If numerical apertures required for recording data to and/or reproducing data from the optical discs D1, D2 and D3 are represented by NA1, NA2 and NA3, respectively, the NA1, NA2 and NA3 satisfy the following relationship.

$$NA1 \geq NA2 > NA3$$

Since as described above the optical disc D1 has the highest recording density, a high numerical aperture is required for the optical disc D1.

The light source 10A is used for the optical disc D1 having the highest recording density. Therefore, the light source 10A emits the laser beam L1 having the shortest wavelength of all of wavelengths of the laser beams L1 to L3 to form the smallest beam spot of all of beam spots for the optical discs D1, D2 and D3. The light source 10B is used for the optical disc D2 having the second highest recording density. Therefore, the light source 10B emits the laser beam L2 having the second shortest wavelength of all of wavelengths of the laser beams L1 to L3 to form the second smallest beam spot of all of beam spots for the optical discs D1, D2 and D3. The light source 10C is used for the optical disc D3 having the lowest recording density. Therefore, the light source 10C emits the laser beam L3 having the longest wavelength of all of wavelengths of the laser beams L1 to L3 to form the largest beam spot of all of beam spots for the optical discs D1, D2 and D3.

Although in this embodiment the light sources 10A to 10C are located at positions away from each other, a light source unit, in which light emitting portions for the optical discs D1 to D3 are aligned in a line on a single substrate, may alternatively be used.

The objective lens 30 is a single-element lens made of resin. The objective lens 30 includes a surface 30a located on a light source side, and a surface 30b located on an optical disc side. As shown in FIGS. 2A to 2C, the surfaces 30a and 30b are aspherical surfaces.

Since different wavelengths are used for the optical discs D1 to D3, a refractive index changes depending on the type of the optical disc being used. Also, the optical discs D1 to D3 have different thicknesses of cover layers. Accordingly, a condition of a spherical aberration changes depending on the type of the optical disc being used.

In this embodiment, the laser beams L1 to L3 are incident on the objective lens 30 at different magnifications so that the spherical aberration caused in the vicinity of the recording surface is corrected for each of the optical discs D1 to D3. More specifically, the laser beam L1 is converted to a converging beam by the coupling lens 20A, and then is incident on the objective lens 30. The laser beams L2 and L3 are converted to diverging beams by the coupling lenses 20B and 20C, respectively, and then are incident on the objective lens 30.

If the optical axis of the objective lens 30 shifts from the reference axis for the tracking operation, off-axis light is incident on the objective lens 30. In such a case, off-axis aberrations, such as a coma, are caused if light is obliquely incident on the objective lens 30. In general, as a required NA for recordation/reproduction of the optical disc increases, tolerance to the aberrations decreases. To sufficiently suppress the aberrations caused when the optical disc D1 requiring the largest NA of all of the optical discs D1 to D3 is used, the objective lens 30 is configured to satisfy the following condition (1):

$$0.02 \leq f1 \times m1 < 0.06 \quad (1)$$

where f1 represents a focal length of the objective lens 30 when the optical disc D1 is used, and m1 represents magnification of the objective lens 30 when the optical disc D1 is used.

By satisfying the condition (1), even if the converging beam for the optical disc D1 is incident on the objective lens 30, a coma and astigmatism caused by the tracking operation when the optical disc D1 is used can be sufficiently suppressed.

To sufficiently suppress the spherical aberration caused when the optical disc D2 or D3 is used, the diverging beam is incident on the objective lens 30 as shown in FIGS. 2B and 2C. More specifically, the objective lens 30 is configured to satisfy the following conditions (2) and (3) in addition to satisfying the condition (1).

$$-0.04 \leq f2 \times m2 < 0.00 \quad (2)$$

$$-0.23 \leq f3 \times m3 < -0.13 \quad (3)$$

In the conditions (2) and (3), f2 represents a focal length of the objective lens 30 when the optical disc D2 is used, m2 represents magnification of the objective lens 30 when the optical disc D2 is used, f3 represents a focal length of the objective lens 30 when the optical disc D3 is used, m3 represents magnification of the objective lens 30 when the optical disc D3 is used.

By satisfying the conditions (2) and (3), the spherical aberration caused when the optical disc D2 or D3 is used is suppressed sufficiently.

As can be seen from the conditions (2) and (3), absolute values of the magnifications m2 and m3 are small. For this reason, even if the diverging beam is used for the optical discs D2 and D3, the coma and astigmatism caused by the tracking operation when the optical disc D2 or D3 is used are suppressed sufficiently.

If f1×m1 gets larger than the upper limit of the condition (1), the aberrations caused during the tracking operation becomes large when the optical disc D1 is used. If f1×m1 gets lower than the lower limit of the condition (1), the aberrations caused during the tracking operation becomes large when each of the optical discs D2 and D3 is used since in such a case absolute values of magnification for the optical discs D2 and D3 become large.

If f2×m2 gets larger than the upper limit of the condition (2) or f3×m3 gets larger than the upper limit of the condition (3), the spherical aberration in an overcorrected condition remains. If f2×m2 gets lower than the lower limit of the condition (2) or f3×m3 gets lower than the lower limit of the condition (3), the spherical aberration in an undercorrected condition remains.

Next, a variation of the objective lens 30 having the configuration as described above will be explained. Hereafter, the variation of the objective lens 30 is explained as an objective lens 300. One of surfaces of the objective lens 300 is provided with a diffracting structure having a plurality of annular zones (i.e. refractive surface sections) divided by steps concentrically formed about the optical axis thereof. For example, the diffracting structure is formed on a light source side surface 300a of the objective lens 30 (see FIG. 3).

Figure 3:
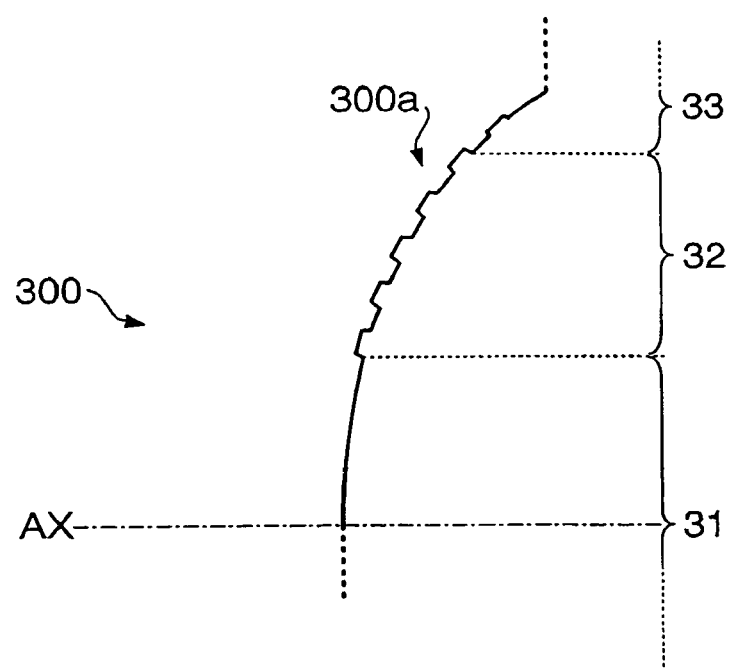
FIG. 3 is a cross-sectional view of the objective lens including an optical axis thereof, illustrating a configuration of a light source side surface.

FIG. 3 is a cross-sectional view of the objective lens 300 including the optical axis, illustrating the configuration of the surface 300a. As shown in FIG. 3, the surface 300a has a first region 31 including the optical axis Ax of the objective lens 300, a second region 32 surrounding the first region 31, a third region 33 surrounding the second region 32. The third region 33 is provided only if the size of the diameter of the laser beam L1 on the surface 300a is different from the size of the diameter of the laser beam L2 on the surface 300a. The third region 33 ranges from the outermost position of the second region 32 to a peripheral portion of the objective lens 300.

The diffracting structure is formed in the second and third region 32 and 33. The diffracting structure formed in each of the second and third region 32 and 33 is configured such that an additional optical path length given by each step (formed between adjacent refractive surface sections) is an integral multiple of a certain wavelength. As described below, the diffracting structure formed in the second region 32 is different from the diffracting structure formed in the third region 33. That is, a shape of each step in the second region 32 is different from a shape of each step in the third region 33.

The diffracting structure formed in the second region 32 is configured not to reduce the diffraction efficiency of the laser beams L1 and L2 for the optical disc D1 and D2, and not to contribute to the convergence of the laser beam L3. More specifically, the diffracting structure formed in the second region 32 is configured as follows. With regard to adjacent refractive surfaces sections, an additional optical path length added by the outer refractive surface section with respect to the inner refractive surface section is substantially equal to $3\lambda_1$ or $-3\lambda_1$ ($\lambda_1$; the wavelength of the laser beam L1). In this case, the additional optical path length added by the outer refractive surface section with respect to the inner refractive surface section becomes substantially equal to $2\lambda_2$ or $-2\lambda_2$ ($\lambda_2$; the wavelength of the laser beam L2). Therefore, the diffraction efficiency of the laser beam L2 is not reduced.

By contrast, the additional optical path length added by the outer refractive surface section with respect to the inner refractive surface section becomes substantially equal to $1.5\lambda_3$ or $-1.5\lambda_3$ ($\lambda_3$; the wavelength of the laser beam L3). Therefore, the laser beam L3 passed through the second region 32 is substantially equally divided into the first order and second order diffracted light. The second region 32 does not contribute to the convergence of the laser beam L3. Therefore, the second region 32 functions as an aperture stop for the laser beam L3.

It is also possible to configure the diffracting structure in the second region 32 such that the additional optical path length added by the outer refractive surface section with respect to the inner refractive surface section is substantially equal to $5\lambda_1$ or $-5\lambda_1$. In this case, the additional optical path length added by the outer refractive surface section with respect to the inner refractive surface section becomes substantially equal to $3\lambda_2$ or $-3\lambda_2$. Therefore, high diffraction efficiency for the laser beam L2 is secured. On the other hand, the additional optical path length added by the outer refractive surface section with respect to the inner refractive surface section becomes substantially equal to $2.5\lambda_3$ or $-2.5\lambda_3$. Therefore, the laser beam L3 passed through the second region 32 is substantially equally divided into the first order and second order diffracted light. The second region 32 does not contribute to the convergence of the laser beam L3.

As described above, the third region 33 is provided only if the size of the diameter of the laser beam L1 on the surface 300a is different from the size of the diameter of the laser beam L2 on the surface 300a.

When the size of the diameter of the laser beam L1 on the surface 300a is larger than that of the laser beam L2, the diffracting structure formed in third region 33 is configured such that the laser beam L1 passed through the third region 33 is suitably converged onto the recording surface of the optical disc D1 with the aberrations being substantially equal to zero. In this case, the third region 33 does not contribute to the convergence of the laser beam L2 in contrast to the second region 32. More specifically, the third region 33 is configured such that the diffraction order at which the diffraction efficiency for the laser beam L1 takes the maximum value in the third region 33 is different from the diffraction order at which the diffraction efficiency for the laser beam L1 takes the maximum value in the second region 32.

More specifically, the diffracting structure formed in the third region 33 is configured as follows. With regard to adjacent refractive surfaces sections, the additional optical path length added by the outer refractive surface section with respect to the inner refractive surface section is substantially equal to $1\lambda_1$ or $-1\lambda_1$ for the laser beam L1. In this case, the additional optical path length added by the outer refractive-surface section with respect to the inner refractive surface section also becomes substantially equal to $0.6\lambda_2$ or $-0.6\lambda_2$ for the laser beam L2, and the additional optical path length added by the outer refractive surface section with respect to the inner refractive surface section also becomes substantially equal to $0.5\lambda_3$ or $-0.5\lambda_3$ for the laser beam L3.

Therefore, almost all of the laser beam L2 (and the laser beam L3) passed through the third region 33 is divided into the zero order and first order diffracted light. The third region 33 does not contribute to the convergence of the laser beams L2 and L3. The third region 33 functions as an aperture stop for the laser beams L2 and L3.

When the size of the diameter of the laser beam L2 on the surface 300a is larger than that of the laser beam L1, the diffracting structure formed in third region 33 is configured such that the laser beam L2 passed through the third region 33 is suitably converged onto the recording surface of the optical disc D2 with the aberrations being substantially equal to zero. In this case, the third region 33 does not contribute to the convergence of the laser beam L1 in contrast to the second region 32. More specifically, the third region 33 is configured such that the diffraction order at which the diffraction efficiency for the laser beam L2 takes the maximum value in the third region 33 is different from the diffraction order at which the diffraction efficiency for the laser beam L2 takes the maximum value in the second region 32.

More specifically, the diffracting structure formed in the third region 33 is configured as follows. With regard to adjacent refractive surfaces sections, the additional optical path length added by the outer refractive surface section with respect to the inner refractive surface section is substantially equal to $1\lambda_2$ or $-1\lambda_2$ for the laser beam L2. In this case, the additional optical path length added by the outer refractive surface section with respect to the inner refractive surface section also becomes substantially equal to $1.6\lambda_1$ or $-1.6\lambda_1$ for the laser beam L1, and the additional optical path length added by the outer refractive surface section with respect to the inner refractive surface section also becomes substantially equal to $0.8\lambda_3$ or $-0.8\lambda_3$ for the laser beam L3.

Therefore, almost all of the laser beam L1 passed through the third region 33 is divided into the first order and second order diffracted light, and almost all of the laser beam L3 passed through the third region 33 is divided into the zero order and first order diffracted light. The third region 33 does not contribute to the convergence of the laser beams L1 and L3. The third region 33 functions as an aperture stop for the laser beams L1 and L3.

By configuring the first, second and third region 31, 32 and 33 as described above, the beam spot suitable for the recordation/reproduction for each of the optical discs D1 to D3 can be obtained.

The optical pick-up 100 is configured such that even if the laser beams L1 and L3 have a relationship that complicates a correction for the aberrations by the diffracting structure, the beam spot suitable for the recordation/reproduction of each of the optical discs D1 to D3 is attained. The relationship that complicates the correction for the aberrations with regard to the laser beams L1 and L3 is as follows:

$$\lambda_1/(n1-1):\lambda_3/(n1-1)\approx 1:2 \quad (4)$$

where $\lambda_1$ represents the wavelength of the laser beam L1, $\lambda_3$ represents the wavelength of the laser beam L3, n1 represents a refractive index of the objective lens 30 (300) for the wavelength $\lambda_1$, and n3 represents a refractive index of the objective lens 30 (300) for the wavelength $\lambda_3$.

When the relationship (4) holds, if the converging beam is incident on the objective lens 30 (300) for substantially completely correcting the aberrations during use of the optical disc D1, the aberrations can be corrected by using diverging beams as incident beams of the objective lens 30 (300) during use of the optical discs D2 and D3. In other words, the optical pick-up 100 supports a plurality of optical discs which are used in a condition in which the relationship (4) holds.

The above mentioned configuration of the optical system 100 (the objective lens 30) according to the embodiment may be explained as follows. The optical system 100 corrects the spherical aberration, which changes depending on the thickness of the cover layer of the optical disc being used and the refractive index variation due to the wavelength difference between the laser beams L1 to L3, by changing the magnification in accordance with the type of the laser beam being used. The magnification of the objective lens 30 (300) in the optical pick-up is as follows.

m1>0 m3<m2<0

That is, the converging beam is incident on the objective lens 30 (300) when the optical disc D1 is used, and the diverging beams are used when the optical discs D2 and D3 are used. In a finite optical system, deterioration of the optical performance during the tracking operation (i.e. tracking shift movement of the objective lens) can not be avoided due to the occurrence of an off-axis coma aberration. The amount of the aberration caused during the tracking operation changes proportionally to an absolute value of the magnification. That is, as the absolute value of the magnification becomes smaller, it becomes possible to effectively suppress the deterioration of the optical performance.

In general, as the NA required for the recordation/reproduction for the optical disc increases, tolerance to the aberrations of the optical disc decreases. In this embodiment, the converging beam is used for the optical disc D1, and the diverging beams satisfying the condition m3<m2<0 are used for the optical discs D2 and D3. Therefore, with regard to each of the optical discs D1 to D3, the amounts of a coma and astigmatism caused by the tracking shift movement of the objective lens are reduced to a negligible level while the spherical aberration is corrected suitably.

Hereafter, three concrete examples of optical pick-ups according to the embodiment will be described. In the following examples, the thickness of the cover layers of the optical discs D1 and D2 are 0.6 mm, and the thickness of the cover layer of the optical disc D3 is 1.2 mm. In the following, optical pick-ups are explained with reference to FIGS. 1 to 3.

FIRST EXAMPLE

An optical pick-up according to a first example will be described. Since an objective lens according to the first example is not provided with the diffracting structure, the reference number 30 is used for the explanation about the objective lens 30 according to the first example. Specifications of the objective lens according to the first example are shown in Table 1.

TABLE 1

|  | laser beam L1 | laser beam L2 | laser beam L3 |
|---|---|---|---|
| Design wavelength (nm) | 405 | 657 | 788 |
| f Focal length (mm) | 3.000 | 3.100 | 3.118 |
| NA | 0.650 | 0.602 | 0.472 |
| magnification | 0.012 | −0.010 | −0.067 |

In Table 1, the design wavelength is a wavelength suitable for the recordation/reproduction of each optical disc, f represents a focal length (unit: mm) of the objective lens 30, NA represents the numerical aperture on an image side. In Table 1, the specifications are indicated with regard to each of the laser beams L1 to L3.

The laser beam L1 is incident on the objective lens 30 as a converging beam when the optical disc D1 is used. Each of the laser beams L2 and L3 is incident on the objective lens 30 as a diverging beam when each of the optical discs D2 and D3 is used.

Table 2 shows a numerical configuration of the optical pick-up 100 when the optical disc D1 (the laser beam L1) is used, Table 3 shows a numerical configuration of the optical pick-up 100 when the optical disc D2 (the laser beam L2) is used, and Table 4 shows a numerical configuration of the optical pick-up 100 when the optical disc D3 (the laser beam L3) is used.

TABLE 2

| surface number | r | d | n(405 nm) | n(657 nm) | n(788 nm) |
|---|---|---|---|---|---|
| 0 |  | 2.20 |  |  |  |
| 1 | ∞ | 1.00 | 1.52972 | 1.51383 | 1.51056 |
| 2 | ∞ | 18.00 |  |  |  |
| 3 | 62.670 | 1.50 | 1.52469 | 1.50645 | 1.50316 |
| 4 | −12.500 | 1.00 |  |  |  |
| 5 | ∞ | 4.00 | 1.52972 | 1.51383 | 1.51056 |
| 6 | ∞ | 1.00 |  |  |  |
| 7 | ∞ | 4.00 | 1.52972 | 1.51383 | 1.51056 |
| 8 | ∞ | 3.39 |  |  |  |
| 9 | 1.872 | 2.30 | 1.52469 | 1.50645 | 1.50316 |
| 10 | −5.709 | 1.33 |  |  |  |
| 11 | ∞ | 0.60 | 1.62231 | 1.57982 | 1.57315 |
| 12 | ∞ | — |  |  |  |

TABLE 3

| surface number | r | d | n(405 nm) | n(657 nm) | n(788 nm) |
|---|---|---|---|---|---|
| 0 |  | 2.01 |  |  |  |
| 1 | ∞ | 1.00 | 1.52972 | 1.51383 | 1.51056 |
| 2 | ∞ | 13.00 |  |  |  |
| 3 | 123.500 | 1.50 | 1.52469 | 1.50645 | 1.50316 |
| 4 | −9.550 | 1.26 |  |  |  |
| 5 | ∞ | 4.00 | 1.52972 | 1.51383 | 1.51056 |
| 6 | ∞ | 1.00 |  |  |  |
| 7 | ∞ | 4.00 | 1.52972 | 1.51383 | 1.51056 |
| 8 | ∞ | 3.25 |  |  |  |
| 9 | 1.872 | 2.30 | 1.52469 | 1.50645 | 1.50316 |
| 10 | −5.709 | 1.47 |  |  |  |
| 11 | ∞ | 0.60 | 1.62231 | 1.57982 | 1.57315 |
| 12 | ∞ | — |  |  |  |

TABLE 4

| surface number | r | d | n(405 nm) | n(657 nm) | n(788 nm) |
|---|---|---|---|---|---|
| 0 |  | 2.64 |  |  |  |
| 1 | ∞ | 1.00 | 1.52972 | 1.51383 | 1.51056 |
| 2 | ∞ | 7.00 |  |  |  |
| 3 | −34.240 | 1.50 | 1.52469 | 1.50645 | 1.50316 |
| 4 | −6.780 | 5.18 |  |  |  |
| 5 | ∞ | 4.00 | 1.52972 | 1.51383 | 1.51056 |
| 6 | ∞ | 3.44 |  |  |  |
| 7 | 1.872 | 2.30 | 1.52469 | 1.50645 | 1.50316 |
| 8 | −5.709 | 1.28 |  |  |  |
| 9 | ∞ | 1.20 | 1.62231 | 1.57982 | 1.57315 |
| 10 | ∞ | — |  |  |  |

In Tables 2-4, "surface number" represents a surface number of each surface of optical components in the optical pick-up 100. In Table 2, a surface #0 represents the light source 10A, surfaces #1 and #2 represent a front surface (a light source side surface) and a rear surface (an objective lens side surface) of the cover glass 11A, surfaces #3 and #4 represent a front surface (a light source side surface) and a rear surface (an objective lens side surface) of the coupling lens 20A, respectively, and surfaces #11 and #12 represent the cover layer and the recording surface of the optical disc D1, respectively. In Table 3, a surface #0 represents the light source 10B, surfaces #1 and #2 represent a front surface (a light source side surface) and a rear surface (an objective lens side surface) of the cover glass 11B, surfaces #3 and #4 represent a front surface (a light source side surface) and a rear surface (an objective lens side surface) of the coupling lens 20B, respectively, and surfaces #11 and #12 represent the cover layer and the recording surface of the optical disc D2, respectively.

In each of Tables 2 and 3, surfaces #5 and #6 represent a light source side surface and an optical disc side surface of the beam splitter 41, respectively, surfaces #7 and #8 represent a light source side surface and an optical disc side surface of the beam splitter 42, respectively, and surfaces #9 and #10 represent the surface 30a and the surface 30b of the objective lens 30, respectively.

In Table 4, a surface #0 represents the light source 10C, surfaces #1 and #2 represent a front surface (a light source side surface) and a rear surface (an objective lens side surface) of the cover glass 11C, and surfaces #3 and #4 represent a front surface (a light source side surface) and a rear surface (an objective lens side surface) of the coupling lens 20C, respectively. In Table 4, surfaces #5 and #6 represent a light source side surface and an optical disc side surface of the beam splitter 42, respectively, surfaces #7 and #8 represent the surface 30a and the surface 30b of the objective lens 30, where, X(h) represents a SAG amount which is a distance between a point on the asherical surface at a height of h from the optical axis and a plane tangential to the aspherical surface at the optical axis, symbol c represents curvature (1/r) on the optical axis, K is a conical coefficient and $A_4, A_6, A_8, A_{10}$ and $A_{12}$ are aspherical coefficients of fourth, sixth, eighth, tenth orders, respectively.

Table 5 shows the conical coefficient and aspherical coefficients of the rear surface (#4) of the coupling lens 20A and the surfaces 30a and 30b (#9 and #10) of the objective lens 30 when the optical disc D1 is used. Table 6 shows the conical coefficient and aspherical coefficients of the rear surface (#4) of the coupling lens 20B and the surfaces 30a and 30b (#9 and #10) of the objective lens 30 when the optical disc D2 is used. Table 7 shows the conical coefficient and aspherical coefficients of the rear surface (#4) of the coupling lens 20C and the surfaces 30a and 30b (#7 and #8) of the objective lens 30 when the optical disc D3 is used. In Tables 5-7, a notation symbol E indicates that 10 is used as a radix and a right side value of E is used as an exponent.

TABLE 5

| surface | κ | A4 | A6 | A8 | A10 | A12 |
|---|---|---|---|---|---|---|
| 4 | 0.0000 | 5.9390E−05 | 2.5850E−07 | 9.3460E−10 | 0.0000E+00 | 0.0000E+00 |
| 9 | −0.6200 | 2.4290E−03 | 3.2780E−04 | 4.3020E−05 | −3.1820E−06 | 1.3994E−06 |
| 10 | 0.0000 | 3.1950E−02 | −9.6830E−03 | 2.5450E−03 | −4.5000E−04 | 3.7580E−05 |

TABLE 6

| surface | κ | A4 | A6 | A8 | A10 | A12 |
|---|---|---|---|---|---|---|
| 4 | 0.0000 | 9.1330E−05 | 7.7930E−07 | 5.7490E−09 | 0.0000E+00 | 0.0000E+00 |
| 9 | −0.6200 | 2.4290E−03 | 3.2780E−04 | 4.3020E−05 | −3.1820E−06 | 1.3994E−06 |
| 10 | 0.0000 | 3.1950E−02 | −9.6830E−03 | 2.5450E−03 | −4.5000E−04 | 3.7580E−05 |

TABLE 7

| surface | κ | A4 | A6 | A8 | A10 | A12 |
|---|---|---|---|---|---|---|
| 4 | 0.0000 | 9.6590E−05 | 1.9790E−06 | 3.8000E−08 | 0.0000E+00 | 0.0000E+00 |
| 7 | −0.6200 | 2.4290E−03 | 3.2780E−04 | 4.3020E−05 | −3.1820E−06 | 1.3994E−06 |
| 8 | 0.0000 | 3.1950E−02 | −9.6830E−03 | 2.5450E−03 | −4.5000E−04 | 3.7580E−05 | respectively, and surfaces #9 and #10 represent the cover layer and the recording surface of the optical disc D3, respectively.

In Tables 2-4, "r" represents a radius of curvature (unit: mm) of each lens surface on the optical axis, "d" represents a thickness of a lens or a distance (unit: mm) from a lens surface to a next lens surface, and "n" represents a refractive index which is indicated for each of wavelengths of 405 nm, 657 nm and 788 nm.

Each of the rear surfaces of the coupling lenses 20A, 20B and 20C and the surfaces 30A and 30B of the objective lens 30 is an aspherical surface. The aspherical surface is expressed by a following equation:

$$X(h) = \frac{ch^2}{1 + \sqrt{1 - (1+K)c^2h^2}} + A_4 h^4 + A_6 h^6 + A_8 h^8 + A_{10} h^{10} + A_{12} h^{12} + \ldots$$

In the first example, f1×m1 takes a value of 0.036, f2×m2 takes a value of −0.031, and f3×m3 takes a value of −0.209. Therefore, the conditions (1) to (3) are satisfied. As can be seen from the design wavelength shown in Table 1 and refractive indexes shown in Tables 2 to 4, $\lambda_1(n1-1):\lambda_3/(n1-1)=1:2$ in this example, and therefore the relationship (4) is also satisfied.

SECOND EXAMPLE

Hereafter, an optical pick-up according to a second example will be described. Since an objective lens according to the second example is provided with the diffracting structure, the configuration of the objective lens according to the second example is explained with reference to FIG. 3. The reference number 300 is used for the explanation about the objective lens according to the second example. Since specifications and the numerical configuration of the optical pick-up 100 and the objective lens 300 according to the second example are the same as those of the first example shown in Tables 1 to 7, explanations thereof will not be repeated.

In the second example, the size of the diameter of the laser beam L1 on the surface 300a of the objective lens 300 is larger than that of the laser beam L2. For this reason, the surface 300a is provided with the diffracting structure so that a desirable NA is attained for each of the optical discs D1 to D3 and, each of the laser beams L1 to L3 is suitably converged on the recording surface of the corresponding optical disc.

More specifically, the diffracting structure is formed in each of the second and third regions 32 and 33, and the first region 31 is not provided with the diffracting structure. The first region 31 is formed to be a refractive surface which contributes to convergence of each of the laser beams L1 to L3.

Each of the first, second and third regions 31 to 33 are formed within a range of height h as indicated below.

FIRST REGION 31: h≦1.58

SECOND REGION: 1.58<h≦1.89

THIRD RGION: 1.89<h≦1.92

Tables 8 shows a numerical configuration of the diffracting structure formed in the second and third regions 32 and 33.

TABLE 8

| number of annular zone | height of start position | height of end position | additional optical path length | |
|---|---|---|---|---|
| 0 | 0.000 | 1.580 | 0 | FIRST REGION |
| 1 | 1.580 | 1.605 | −3 | SECOND REGION |
| 2 | 1.605 | 1.616 | 0 | |
| 3 | 1.616 | 1.643 | −3 | |
| 4 | 1.643 | 1.657 | 0 | |
| 5 | 1.657 | 1.682 | −3 | |
| 6 | 1.682 | 1.699 | 0 | |
| 7 | 1.699 | 1.720 | −3 | |
| 8 | 1.720 | 1.741 | 0 | |
| 9 | 1.741 | 1.758 | −3 | |
| 10 | 1.758 | 1.783 | 0 | |
| 11 | 1.783 | 1.795 | −3 | |
| 12 | 1.795 | 1.827 | 0 | |
| 13 | 1.827 | 1.839 | −3 | |
| 14 | 1.839 | 1.870 | 0 | |
| 15 | 1.870 | 1.890 | −3 | |
| 16 | 1.890 | 1.895 | 0 | THIRD REGION |
| 17 | 1.895 | 1.910 | −1 | |
| 18 | 1.910 | 1.920 | 0 | |

In Table 8, the first region 31 is assigned the annular zone number #0, the second region 32 is provided with fifteen annular zones (the annular zone numbers #1 to #15), and the third region 33 is provided with three annular zones (the annular zone numbers #16 to #18). In Table 8 (and in the following similar Tables), "additional optical path length" represents an additional optical path length added by each annular zone with respect to the annular zone #0, "height of start position" represents a height of a start position of each annular zone from the optical axis, and "height of end position" represents a height of an end position of each annular zone from the optical axis.

As shown in Table 8, the diffracting structure in the second region 32 is configured such that the additional optical path length given at each boundary (step) between adjacent annual zones is substantially equal to $3\lambda_1$ or $-3\lambda_1$ ($\lambda_1$: the wavelength of the laser beam L1). Therefore, the second region 32 does not contribute to convergence of the laser beam L3. The second region 32 functions as the aperture stop for the laser beam L3.

The diffracting structure in the third region 33 is configured such that the additional optical path length given at each boundary (step) between adjacent annular zones is substantially equal to $1\lambda_1$ or $-1\lambda_1$. The third region 33 is configured such that the diffraction order at which the diffraction efficiency for the laser beam L1 takes the maximum value in the third region 33 (i.e., the first order) is different from the diffraction order at which the diffraction efficiency for the laser beam L1 takes the maximum value in the second region 32 (i.e., the third order). Therefore, the third region 33 does not contribute to convergence of the laser beam L2. The third region 33 functions as the aperture stop for the laser beam L2.

THIRD EXAMPLE

Hereafter, an optical pick-up according to a third example will be described. Since an objective lens according to the third example is provided with the diffracting structure, the configuration of the objective lens according to the third example is explained with reference to FIG. 3. The reference number 300 is used for the explanation about the objective lens according to the third example. Since specifications and the numerical configuration of the optical pick-up 100 and the objective lens 300 according to the third example are the same as those of the first example shown in Tables 1 to 7, explanations thereof will not be repeated.

Similarly to the second example, the surface 300a of the objective lens 300 is provided with first and third regions 31 to 33 so that the desirable NA is attained for each of the optical discs D1 to D3, and each of the laser beams L1 to L3 is suitably converged on the recording surface of the corresponding optical disc. However, the diffracting structure of the third example is different from that of the second example.

The diffracting structure is formed in each of the second and third regions 32 and 33, and the first region 31 is not provided with the diffracting structure. The first region 31 is formed to be a refractive surface which contributes to convergence of each of the laser beams L1 to L3. Each of the first, second and third regions 31 to 33 are formed within a range of height h as indicated below.

FIRST REGION 31: h≦1.58

SECOND REGION: 1.58<h≦1.89

THIRD REGION: 1.89<h≦1.92

Tables 9 shows a numerical configuration of the diffracting structure formed in the second and third regions 32 and 33.

TABLE 9

| number of annular zone | height of start position | height of end position | additional optical path length | |
|---|---|---|---|---|
| 0 | 0.000 | 1.580 | 0 | FIRST REGION |
| 1 | 1.580 | 1.609 | −5 | SECOND REGION |
| 2 | 1.609 | 1.619 | 0 | |
| 3 | 1.619 | 1.649 | −5 | |
| 4 | 1.649 | 1.659 | 0 | |
| 5 | 1.659 | 1.689 | −5 | |
| 6 | 1.689 | 1.700 | 0 | |
| 7 | 1.700 | 1.720 | −5 | |
| 8 | 1.720 | 1.746 | 0 | |
| 9 | 1.746 | 1.759 | −5 | |
| 10 | 1.759 | 1.785 | 0 | |
| 11 | 1.785 | 1.795 | −5 | |
| 12 | 1.795 | 1.821 | 0 | |
| 13 | 1.821 | 1.831 | −5 | |
| 14 | 1.831 | 1.867 | 0 | |
| 15 | 1.867 | 1.877 | −5 | |
| 16 | 1.877 | 1.890 | 0 | |
| 17 | 1.890 | 1.897 | −1 | THIRD REGION |

TABLE 9-continued

| number of annular zone | height of start position | height of end position | additional optical path length |
|---|---|---|---|
| 18 | 1.897 | 1.909 | 0 |
| 19 | 1.909 | 1.915 | −1 |
| 20 | 1.915 | 1.920 | 0 |

In Table 9, the first region 31 is assigned the annular zone number #0, the second region 32 is provided with sixteen annular zones (the annular zone numbers #1 to #16), and the third region 33 is provided with four annular zones (the annular zone numbers #17 to #20).

As shown in Table 9, the diffracting structure in the second region 32 is configured such that the additional optical path length given at each boundary (step) between adjacent annular zones is substantially equal to $5\lambda_1$ or $-5\lambda_1$ ($\lambda_1$: the wavelength of the laser beam L1). Therefore, the second region 32 does not contribute to convergence of the laser beam L3. The second region 32 functions as the aperture stop for the laser beam L3.

The diffracting structure in the third region 33 is configured such that the additional optical path length given at each boundary (step) between adjacent annular zones is substantially equal to $1\lambda_1$ or $-1\lambda_1$. The third region 33 is configured such that the diffraction order at which the diffraction efficiency for the laser beam L1 takes the maximum value in the third region 33 (i.e., the first order) is different from the diffraction order at which the diffraction efficiency for the laser beam L1 takes the maximum value in the second region 32 (i.e., the fifth order). Therefore, the third region 33 does not contribute to convergence of the laser beam L2. The third region 33 functions as the aperture stop for the laser beam L2.

Figure 4A:
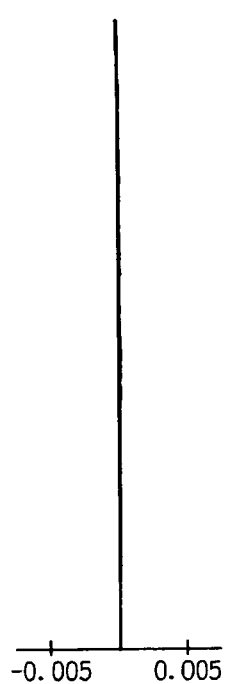
FIG. 4A is a graph illustrating a spherical aberration caused when a laser beam for the optical disc having the highest recording density passes through an objective lens of an optical pick-up according to a first example.
Figure 4B:
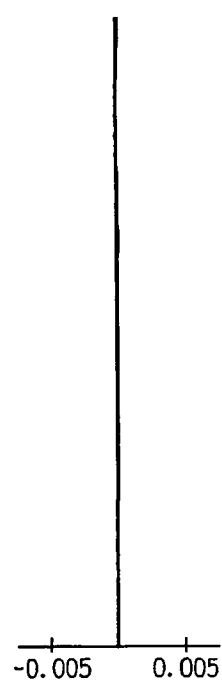
FIG. 4B is a graph illustrating a spherical aberration caused when a laser beam for the optical disc having the second highest recording density passes through an objective lens of an optical pick-up according to a second example.
Figure 4C:
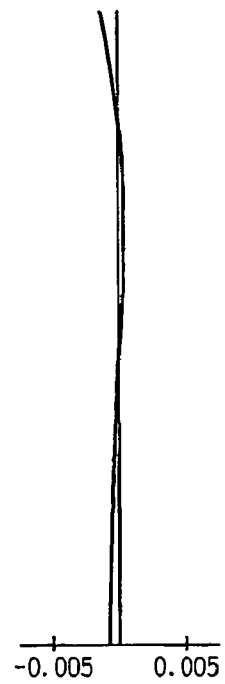
FIG. 4C is a graph illustrating a spherical aberration caused when a laser beam for an optical disc having the lowest recording density passes through an objective lens of an optical pick-up according to a third example.

FIG. 4A is a graph illustrating a spherical aberration caused when the laser beam L1 passes through the objective lens 30 of the optical pick-up 100 according to the first example. FIG. 4B is a graph illustrating a spherical aberration caused when the laser beam L2 passes through the objective lens 300 of the optical pick-up 100 according to the second example. FIG. 4C is a graph illustrating a spherical aberration caused when the laser beam L3 passes through the objective lens 300 of the optical pick-up 100 according to the third example. As shown in FIGS. 4A to 4C, the spherical aberration is sufficiently corrected for each of the optical discs D1 to D3. Therefore, the beam spot having the size suitable for the recordation/reproduction for each of the optical discs D1 to D3 is attained.

Hereafter, optical performance of the optical pick-up 100 according to the first through third examples during the tracking shift movement of the objective lens 30 (300) will be explained. Optical performance of a comparative example (i.e., a conventional optical pick-up) is also indicated to show the advantage of the optical performance of the optical pick-up 100 according to the embodiment.

A configuration of an optical pick-up (i.e. an objective lens) according to the comparative example is as follows. The optical pick-up according to the comparative example is configured to have the specifications as shown in Table 1 except for the magnification. That is, the optical pick-up (i.e. the objective lens) according to the comparative example is configured to have the following magnification.

0.000 for the laser beam L1
−0.024 for the laser beam L2
−0.079 for the laser beam L3

Figure 5A:
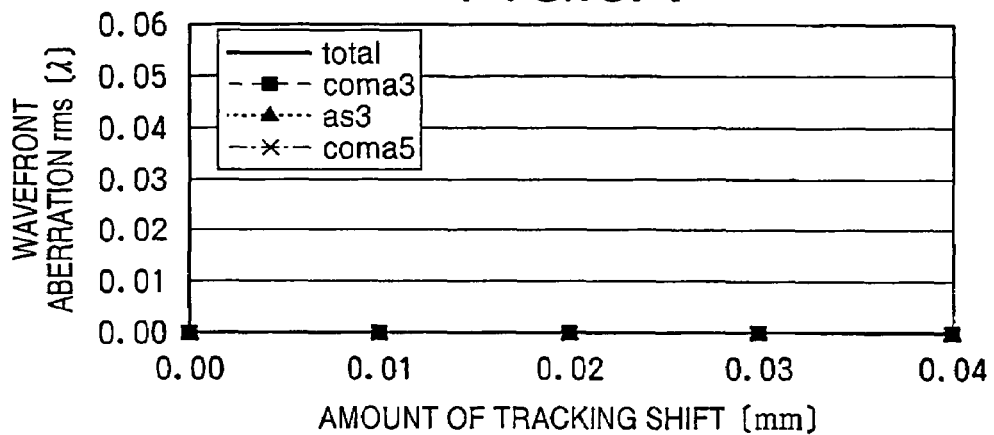
FIG. 5A is a graph illustrating the amounts of the aberrations caused in a comparative example when the optical disc having the highest recording density is used.
Figure 5B:
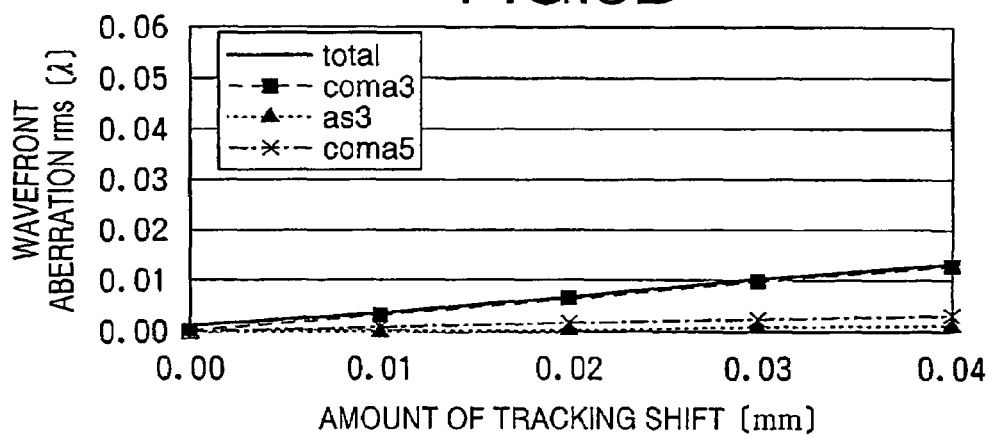
FIG. 5B is a graph illustrating the amounts of the aberrations caused in the comparative example when the optical disc having the second highest recording density is used.
Figure 5C:
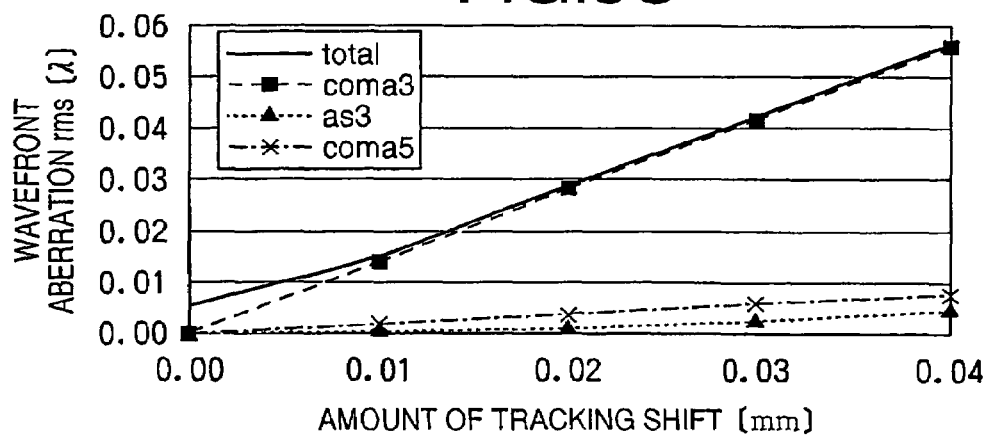
FIG. 5C is a graph illustrating the amounts of the aberrations caused in the comparative example when the optical disc having the lowest recording density is used.

FIGS. 5A to 5C show the amounts of aberrations caused in the optical system according to the comparative example during the tracking operation. FIG. 5A is a graph illustrating the amounts of the aberrations caused when the optical disc D1 is used. FIG. 5B is a graph illustrating the amounts of the aberrations caused when the optical disc D2 is used. FIG. 5C is a graph illustrating the amounts of the aberrations caused when the optical disc D3 is used. In each of FIGS. 5A to 5C (and in the following similar graphs), the vertical axis represents the amount of aberration, and the horizontal axis represents the amount of tracking shift movement of the objective lens.

Table 10 shows numerical data regarding the graph of FIG. 5A Table 11 shows numerical data regarding the graph of FIG. 5B. Table 12 shows numerical data regarding the graph of FIG. 5C.

TABLE 10

| | AMOUNT OF TRACKING SHIFT | | | | |
|---|---|---|---|---|---|
| | 0.000 | 0.010 | 0.020 | 0.030 | 0.040 |
| total | 0.000 | 0.000 | 0.000 | 0.000 | 0.000 |
| sa3 | 0.000 | 0.000 | 0.000 | 0.000 | 0.000 |
| coma3 | 0.000 | 0.000 | 0.000 | 0.000 | 0.000 |
| as3 | 0.000 | 0.000 | 0.000 | 0.000 | 0.000 |
| sa5 | 0.000 | 0.000 | 0.000 | 0.000 | 0.000 |
| coma5 | 0.000 | 0.000 | 0.000 | 0.000 | 0.000 |
| as5 | 0.000 | 0.000 | 0.000 | 0.000 | 0.000 |

TABLE 11

| | AMOUNT OF TRACKING SHIFT | | | | |
|---|---|---|---|---|---|
| | 0.000 | 0.010 | 0.020 | 0.030 | 0.040 |
| total | 0.002 | 0.004 | 0.007 | 0.010 | 0.013 |
| sa3 | 0.001 | 0.001 | 0.001 | 0.001 | 0.001 |
| coma3 | 0.000 | 0.003 | 0.006 | 0.010 | 0.013 |
| as3 | 0.000 | 0.000 | 0.000 | 0.001 | 0.001 |
| sa5 | 0.001 | 0.001 | 0.001 | 0.001 | 0.001 |
| coma5 | 0.000 | 0.001 | 0.002 | 0.002 | 0.003 |
| as5 | 0.000 | 0.000 | 0.000 | 0.000 | 0.000 |

TABLE 12

| | AMOUNT OF TRACKING SHIFT | | | | |
|---|---|---|---|---|---|
| | 0.000 | 0.010 | 0.020 | 0.030 | 0.040 |
| total | 0.006 | 0.015 | 0.029 | 0.043 | 0.057 |
| sa3 | 0.001 | 0.001 | 0.001 | 0.001 | 0.002 |
| coma3 | 0.000 | 0.014 | 0.028 | 0.042 | 0.056 |
| as3 | 0.000 | 0.000 | 0.001 | 0.003 | 0.005 |
| sa5 | 0.006 | 0.006 | 0.005 | 0.005 | 0.005 |
| coma5 | 0.000 | 0.002 | 0.004 | 0.006 | 0.008 |
| as5 | 0.000 | 0.000 | 0.000 | 0.001 | 0.001 |

In FIGS. 5A to 5C and Tables 10 to 12, "sa3" and "sa5" represent the third order and fifth order spherical aberrations, "coma3" and "coma5" represent the third order and fifth order coma aberrations, and "as3" and "as5" represent the third order and fifth order astigmatism.

Figure 6A:
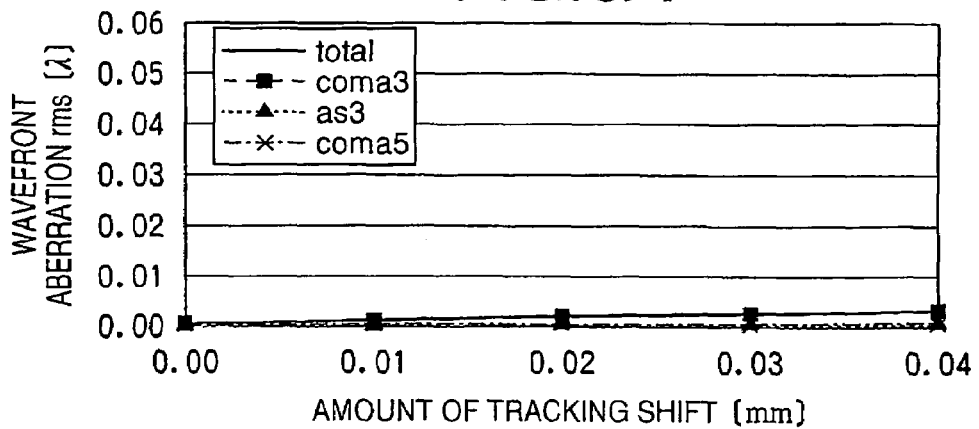
FIG. 6A is a graph illustrating the amounts of the aberrations caused in the optical pick-up according to the embodiment when the optical disc having the highest recording density is used.
Figure 6B:
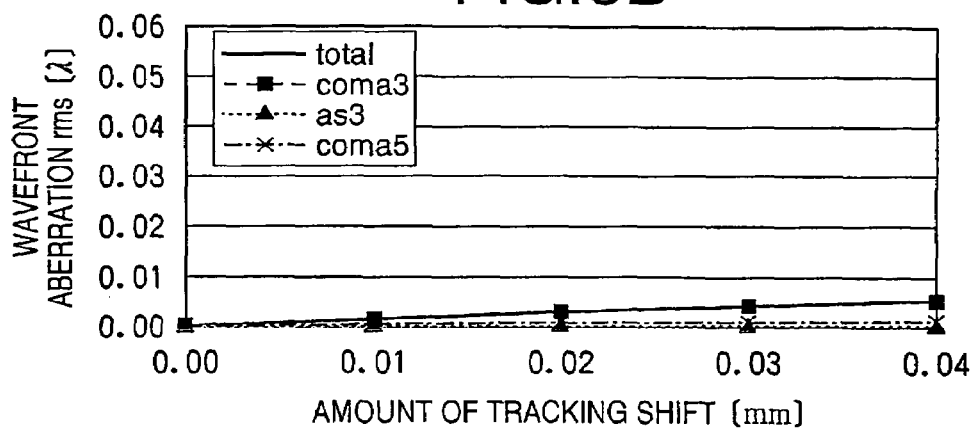
FIG. 6B is a graph illustrating the amounts of the aberrations caused in the optical pick-up according to the embodiment when the optical disc having the second highest recording density is used.
Figure 6C:
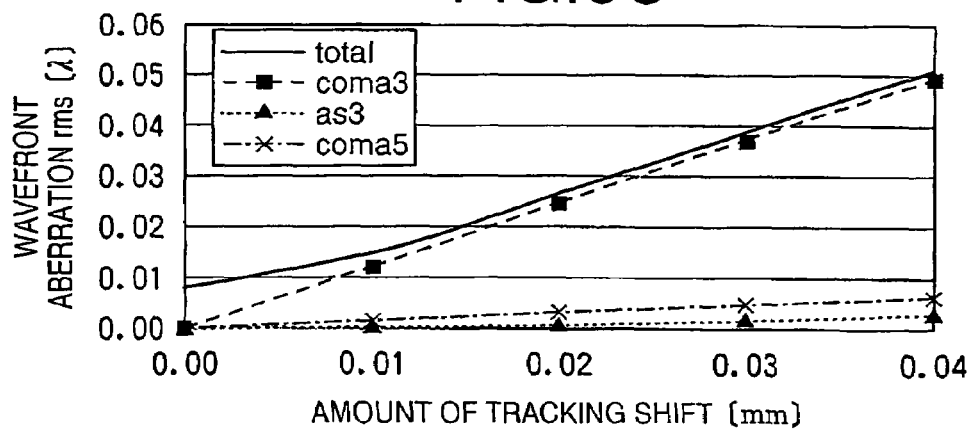
FIG. 6C is a graph illustrating the amounts of the aberrations caused in the optical pick-up according to the embodiment when the optical disc having the lowest recording density is used.

FIGS. 6A to 6C show the amounts of aberrations caused in each of the optical systems 100 according to the first through third examples during the tracking operation. FIG. 6A is a graph illustrating the amounts of the aberrations caused when the optical disc D1 is used. FIG. 6B is a graph illustrating the amounts of the aberrations caused when the optical disc D2 is used. FIG. 6C is a graph illustrating the amounts of the aberrations caused when the optical disc D3 is used.

Table 13 shows numerical data regarding the graph of FIG. 6A. Table 14 shows numerical data regarding the grap of FIG. 6B. Table 15 shows numerical data regarding the graph of FIG. 6C.

TABLE 13

| | AMOUNT OF TRACKING SHIFT | | | | |
|---|---|---|---|---|---|
| | 0.000 | 0.010 | 0.020 | 0.030 | 0.040 |
| total | 0.000 | 0.001 | 0.002 | 0.002 | 0.003 |
| sa3 | 0.000 | 0.000 | 0.000 | 0.000 | 0.000 |
| coma3 | 0.000 | 0.001 | 0.002 | 0.002 | 0.003 |
| as3 | 0.000 | 0.000 | 0.000 | 0.000 | 0.000 |
| sa5 | 0.000 | 0.000 | 0.000 | 0.000 | 0.000 |
| coma5 | 0.000 | 0.000 | 0.000 | 0.000 | 0.000 |
| as5 | 0.000 | 0.000 | 0.000 | 0.000 | 0.000 |

TABLE 14

| | AMOUNT OF TRACKING SHIFT | | | | |
|---|---|---|---|---|---|
| | 0.000 | 0.010 | 0.020 | 0.030 | 0.040 |
| total | 0.000 | 0.001 | 0.003 | 0.004 | 0.005 |
| sa3 | 0.000 | 0.000 | 0.000 | 0.000 | 0.000 |
| coma3 | 0.000 | 0.001 | 0.003 | 0.004 | 0.005 |
| as3 | 0.000 | 0.000 | 0.000 | 0.000 | 0.000 |
| sa5 | 0.000 | 0.000 | 0.000 | 0.000 | 0.000 |
| coma5 | 0.000 | 0.000 | 0.001 | 0.001 | 0.001 |
| as5 | 0.000 | 0.000 | 0.000 | 0.000 | 0.000 |

TABLE 15

| | AMOUNT OF TRACKING SHIFT | | | | |
|---|---|---|---|---|---|
| | 0.000 | 0.010 | 0.020 | 0.030 | 0.040 |
| total | 0.008 | 0.015 | 0.026 | 0.038 | 0.050 |
| sa3 | 0.006 | 0.006 | 0.006 | 0.006 | 0.007 |
| coma3 | 0.000 | 0.012 | 0.024 | 0.037 | 0.049 |
| as3 | 0.000 | 0.000 | 0.001 | 0.002 | 0.004 |
| sa5 | 0.006 | 0.006 | 0.006 | 0.006 | 0.006 |
| coma5 | 0.000 | 0.002 | 0.003 | 0.005 | 0.007 |
| as5 | 0.000 | 0.000 | 0.000 | 0.000 | 0.001 |

As shown in FIG. 5A and Table 10, the optical performance during the tracking shift movement of the objective lens of the comparative example is excellent because the collimated beam is incident on the objective lens when the optical disc D1 is used. However, absolute values of the magnification are large for the optical discs D2 and D3. For this reason, as shown in FIGS. 5B and 5C and Tables 11 and 12, a large amount of a coma aberration is caused in the comparative example during the tracking shift movement of the objective lens when each of the optical discs D2 and D3 is used.

By contrast, in the optical pick-up 100 of each of the first through third examples, the converging beam is incident on the objective lens 30 (300) during use of the laser beam L1 so that the absolute value of the magnification for each of the laser beams L2 and L3 can be decreased. For this reason, a small amount of the coma aberration is caused during the tracking shift movement of the objective lens 30 (300) when the optical disc D1 is used. However, the small amount of the coma aberration caused during the tracking shift movement of the objective lens 30 (300) when the optical disc D1 is used can be neglected (i.e. the recordation/reproduction operation for the optical disc D1 is not affected by the coma aberration shown in FIG. 5A and Table 10).

Also, the coma aberration caused in the optical pick-up 100 during the tracking shift movement when the optical disc D2 is used is reduced to approximately 40% of the coma aberration caused in the comparative example during the tracking shift movement when the optical disc D2 is used. The coma aberration caused in the optical pick-up 100 during the tracking shift movement when the optical disc D3 is used is reduced to approximately 90% of the coma aberration caused in the comparative example during the tracking shift movement when the optical disc D3 is used.

The numerical configurations of the first through third examples have been described by way of example, other numerical configurations according to the embodiment are also possible.

Although the present invention has been described in considerable detail with reference to certain preferred embodiments thereof, other embodiments are possible.

For example, the diffracting structure may be formed on the optical disc side surface of the objective lens 30 (300), or may be formed on both of the light source side surface 30a (300a) and the optical disc side surface of the objective lens 30 (300).

The numerical apertures in Table 1 are also shown by way of example. A relatively large NA of approximately 0.5 may be used for the objective lens 30 (300) for use of the optical disc D3 configured as a writable optical disc.

Also, a relatively large NA of approximately 0.65 may be used for the objective lens 30 (300) for use of the optical disc D2. In this case, the NA for the optical disc D2 becomes equal to the NA for the optical disc D3. Therefore, in this case, the third region 33 is not required.

Figure 7:
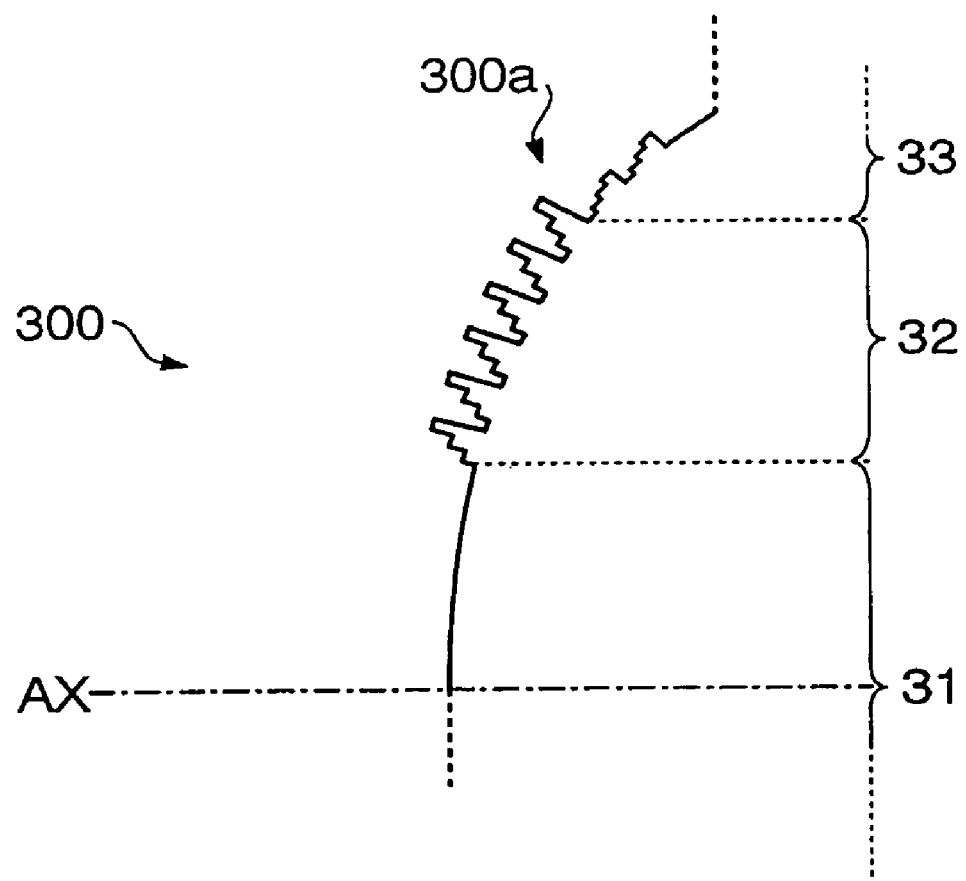
FIG. 7 is a cross-sectional view of the objective lens illustrating another example of the diffracting structure.

A diffracting structure other than the structure shown in FIG. 3 may also be employed. For example, the diffracting structures shown in FIG. 7 may be formed in the second and third regions 32 and 33 of the surface 300a of the objective lens 300. The diffracting structure in each of the second and third regions 32 and 33 is configured to have a plurality of group of steps. Each group of steps includes three steps each of which gives an additional optical path length corresponding to an integral multiple of a certain wavelength (e.g. the wavelength of the laser beam L1) in a predetermined direction, and includes one step which gives an additional optical path length corresponding to a sum of the additional optical path lengths given by the three steps in a direction opposite to the predetermined direction (see FIG. 7).

The present disclosure relates to the subject matter contained in Japanese Patent Application No. P2004-012236, filed on Jan. 20, 2004, which is expressly incorporated herein by reference in its entirety.

What is claimed is:

1. An optical pick-up used for recording data to and/or reproducing data from at least three types of optical discs having at least two different thicknesses of cover layers, comprising:

light sources capable of emitting at least three light beams having different wavelengths, one of the at least three light beams being selectively emitted when one of the at least three types of optical discs is used; and an objective lens, wherein when a thickness of a first optical disc of the at least three types of optical discs to be used for recording data and/or reproducing data using a first light beam of the at least three light beams having a wavelength shortest of all wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, a relationship t1≦t2≦t3 is satisfied, wherein when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 is satisfied, wherein the first light beam is incident on the objective lens as a converging light beam, and the second and third light beams are incident on the objective lens as diverging light beams, respectively, wherein given that magnification of the objective lens is m1 when the first optical disc is used, magnification of the objective lens is m2 when the second optical disc is used, and magnification of the objective lens is m3 when the third optical disc is used, following conditions are satisfied:

m1>0 m3<m2<0.

2. The optical pick-up according to claim 1,
wherein the thicknesses of the first, second and third optical discs are represented by t1, t2 and t3, respectively, t1 is substantially equal to 0.6 mm, t2 is substantially equal to 0.6 mm, and t3 is substantially equal to 1.2 mm, and wherein given that a focal length of the objective lens is f1 when the first optical disc is used, a focal length of the objective lens is f2 when the second optical disc is used, and a focal length of the objective lens is f3 when the third optical disc is used, following conditions (1), (2) and (3) are satisfied:

0.02≦f1×m1<0.06    (1)

−0.04≦f2×m2<0.00    (2)

−0.23≦f3×m3<−0.13    (3).

3. The optical pick-up according to claim 1,
wherein at least one of surfaces of the objective lens has a first region including an optical axis of the objective lens, and has a second region surrounding the first region, wherein the third light beam corresponding to the numerical aperture required for recording data to and/or reproducing data from the third optical disc is incident on the first region, and wherein the second region has a diffracting structure configured to converge the first and second light beams onto recording surfaces of the first and second optical discs, respectively, and not to contribute to convergence of the third light beam.

4. The optical pick-up according to claim 3,
wherein the diffracting structure of the second region has a plurality of refractive surface sections divided by steps, and wherein at each step between adjacent refractive surface sections in the diffracting structure, an outer one of the adjacent refractive surface sections gives an additional optical path length substantially equal to 3λ$_1$ or −3λ$_1$ with respect to an inner one of the adjacent refractive surface sections if the wavelength of the first light beam is represented by λ$_1$.

5. The optical pick-up according to claim 3,
wherein the diffracting structure of the second region has a plurality of refractive surface sections divided by steps, and wherein at each step between adjacent refractive surface sections in the diffracting structure, an outer one of the adjacent refractive surface sections gives an additional optical path length substantially equal to 5λ$_1$ or −5λ$_1$ with respect to an inner one of the adjacent refractive surface sections if the wavelength of the first light beam is represented by λ$_1$.

6. The optical pick-up according to claim 3,
wherein an effective diameter of the first light beam on an incident surface of the objective lens is larger than an effective diameter of the second light beam on the incident surface of the objective lens, wherein the at least one of surfaces of the objective lens has a third region surrounding the second region, the third region having a diffracting structure configured to converge only the first light beam, and wherein a diffraction order at which a diffraction efficiency for the first light beam takes a maximum value in the third region is different from a diffraction order at which the diffraction efficiency for the first light beam takes a maximum value in the second region.

7. The optical pick-up according to claim 6,
wherein the diffracting structure of the third region has a plurality of refractive surface sections divided by steps, and wherein at each step between adjacent refractive surface sections in the diffracting structure of the third region, an outer one of the adjacent refractive surface sections gives an additional optical path length substantially equal to 1λ$_1$ or −1λ$_1$ with respect to an inner one of the adjacent refractive surface sections if the wavelength of the first light beam is represented by λ$_1$.

8. The optical pick-up according to claim 3,
wherein an effective diameter of the second light beam on an incident surface of the objective lens is larger than an effective diameter of the first light beam on the incident surface of the objective lens, wherein the at least one of surfaces of the objective lens has a third region surrounding the second region, the third region having a diffracting structure configured to converge only the second light beam, and wherein a diffraction order at which a diffraction efficiency for the second light beam takes a maximum value in the third region is different from a diffraction order at which the diffraction efficiency for the second light beam takes a maximum value in the second region.

9. The optical pick-up according to claim 8,
wherein the diffracting structure of the third region has a plurality of refractive surface sections divided by steps, and wherein at each step between adjacent refractive surface sections in the diffracting structure of the third region, an outer one of the adjacent refractive surface sections gives an additional optical path length substantially equal to 1λ$_2$ or −1λ$_2$ with respect to an inner one of the adjacent refractive surface sections if the wavelength of the second light beam is represented by λ$_2$.

10. The optical pick-up according to claim 1,
wherein when the wavelengths of the first and third light beams are respectively represented by $\lambda_1$ and $\lambda_3$, and refractive indexes of the objective lens for the first and third light beams are respectively represented by n1 and n3, a following relationship is satisfied:

$$\lambda_1/(n1-1):\lambda_3/(n3-1) \cong 1:2 \qquad (4).$$

11. An objective lens for an optical pick-up used for recording data to and/or reproducing data from at least three types of optical discs having at least two different thicknesses of cover layers, at least three light beams being respectively used for the at least three types of optical discs,
wherein when a thickness of a first optical disc of the at least three types of optical discs to be used for recording data and/or reproducing data using a first light beam of the at least three light beams having a wavelength shortest of all wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, a relationship $t1 \leq t2 < t3$ is satisfied,
wherein when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship $NA1 \geq NA2 > NA3$ is satisfied,
wherein the first light beam is incident on the objective lens as a converging light beam, and the second and third light beams are incident on the objective lens as diverging light beams, respectively,
wherein at least one of surfaces of the objective lens has a first region including an optical axis of the objective lens, and has a second region surrounding the first region,
wherein the third light beam corresponding to the numerical aperture required for recording data to and/or reproducing data from the third optical disc is incident on the first region, and
wherein the second region has a diffracting structure configured to converge the first and second light beams onto recording surfaces of the first and second optical discs, respectively, and not to contribute to convergence of the third light beam,
wherein given that magnification of the objective lens for the first light beam is represented by m1, magnification of the objective lens for the second light beam is represented by m2, and magnification of the objective lens for the third light beam is represented by m3, the objective lens satisfies following conditions:

$$m1 > 0$$

$$m3 < m2 < 0.$$

12. The objective lens according to claim 11,
wherein the thicknesses of the first, second and third optical discs are represented by t1, t2 and t3, respectively, t1 is substantially equal to 0.6 mm, t2 is substantially equal to 0.6 mm, and t3 is substantially equal to 1.2 mm, and
wherein given that a focal length of the objective lens is f1 when the first optical disc is used, a focal length of the objective lens is f2 when the second optical disc is used, and a focal length of the objective lens is f3 when the third optical disc is used, the objective lens satisfies following conditions (1), (2) and (3):

$$0.02 \leq f1 \times m1 < 0.06 \qquad (1)$$

$$-0.04 \leq f2 \times m2 < 0.00 \qquad (2)$$

$$-0.23 \leq f3 \times m3 < -0.13 \qquad (3).$$

13. The objective lens according to claim 11,
wherein the diffracting structure of the second region has a plurality of refractive surface sections divided by steps, and
wherein at each step between adjacent refractive surface sections in the diffracting structure, an outer one of the adjacent refractive surface sections gives an additional optical path length substantially equal to $3\lambda_1$ or $-3\lambda_1$ with respect to an inner one of the adjacent refractive surface sections if the wavelength of the first light beam is represented by $\lambda_1$.

14. The objective lens according to claim 11,
wherein the diffracting structure of the second region has a plurality of refractive surface sections divided by steps, and
wherein at each step between adjacent refractive surface sections in the diffracting structure, an outer one of the adjacent refractive surface sections gives an additional optical path length substantially equal to $5\lambda_1$ or $-5\lambda_1$ with respect to an inner one of the adjacent refractive surface sections if the wavelength of the first light beam is represented by $\lambda_1$.

15. The objective lens according to claim 11,
wherein an effective diameter of the first light beam on an incident surface of the objective lens is larger than an effective diameter of the second light beam on the incident surface of the objective lens,
wherein the at least one of surfaces of the objective lens has a third region surrounding the second region, the third region having a diffracting structure configured to converge only the first light beam, and
wherein a diffraction order at which a diffraction efficiency for the first light beam takes a maximum value in the third region is different from a diffraction order at which the diffraction efficiency for the first light beam takes a maximum value in the second region.

16. The objective lens according to claim 15,
wherein the diffracting structure of the third region has a plurality of refractive surface sections divided by steps, and
wherein at each step between adjacent refractive surface sections in the diffracting structure of the third region, an outer one of the adjacent refractive surface sections gives an additional optical path length substantially equal to $1\lambda_1$ or $-1\lambda_1$ with respect to an inner one of the adjacent refractive surface sections if the wavelength of the first light beam is represented by $\lambda_1$.

17. The objective lens according to claim 11,
wherein an effective diameter of the second light beam on an incident surface of the objective lens is larger than an effective diameter of the first light beam on the incident surface of the objective lens,
wherein the at least one of surfaces of the objective lens has a third region surrounding the second region, the third region having a diffracting structure configured to converge only the second light beam, and
wherein a diffraction order at which a diffraction efficiency for the second light beam takes a maximum value in the third region is different from a diffraction order at which the diffraction efficiency for the second light beam takes a maximum value in the second region.

18. The objective lens according to claim 17,
wherein the diffracting structure of the third region has a plurality of refractive surface sections divided by steps, and
wherein at each step between adjacent refractive surface sections in the diffracting structure of the third region, an outer one of the adjacent refractive surface sections gives an additional optical path length substantially equal to $1\lambda_2$ or $-1\lambda_2$ with respect to an inner one of the adjacent refractive surface sections if the wavelength of the second light beam is represented by $\lambda_2$.

* * * * *